US011750710B2

United States Patent
Parekh et al.

(10) Patent No.: US 11,750,710 B2
(45) Date of Patent: Sep. 5, 2023

(54) MANAGEMENT CLUSTER WITH INTEGRATION SERVICE FOR DEPLOYING AND MANAGING A SERVICE IN TENANT CLUSTERS

(71) Applicant: Hewlett Packard Enterprise Development LP, Houston, TX (US)

(72) Inventors: Hardik Dhirendra Parekh, Bangalore Karnataka (IN); Akash Vinodchandra Patel, Bangalore Karnataka (IN); Sonu Sudhakaran, Bangalore Karnataka (IN); Pradeep Kumar Achi Vasudevan, Bangalore Karnataka (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 17/649,751

(22) Filed: Feb. 2, 2022

(65) Prior Publication Data
US 2023/0171322 A1 Jun. 1, 2023

(30) Foreign Application Priority Data
Nov. 30, 2021 (IN) .............................. 202141055449

(51) Int. Cl.
*H04L 67/51* (2022.01)
*H04L 9/40* (2022.01)
*H04L 67/133* (2022.01)

(52) U.S. Cl.
CPC ............ *H04L 67/51* (2022.05); *H04L 63/102* (2013.01); *H04L 63/104* (2013.01); *H04L 67/133* (2022.05)

(58) Field of Classification Search
CPC ....... H04L 67/10; H04L 67/133; H04L 63/10; H04L 63/102; H04L 63/104;
(Continued)

(56) References Cited

U.S. PATENT DOCUMENTS 8,473,615 B1* 6/2013 Rowland ............... G06F 9/5077
709/225
8,924,559 B2 12/2014 Brown et al.
(Continued)

FOREIGN PATENT DOCUMENTS

WO WO-2018234741 12/2018

OTHER PUBLICATIONS

Argo Project Authors, "Overview", accessed on Aug. 9, 2021, 5 pages, retrieved from internet <https://argoproj.github.io/argo-cd/>.
(Continued)

*Primary Examiner* — Tonia L Dollinger
*Assistant Examiner* — Linh T. Nguyen
(74) *Attorney, Agent, or Firm* — Trop, Pruner & Hu, P.C.

(57) ABSTRACT

Examples described herein relate to a system and method for deploying and managing services in tenant clusters using a management cluster. The management cluster includes an integration service in communication with a service controller. The integration service communicates with a service endpoint using privileged credentials for receiving tenant cluster-specific configuration information. The integration service generates access credentials for the new tenant cluster to communicate with the service provider. The integration service provides tenant cluster-specific configuration information and access credentials to the service controller for the deployment of the service in the new tenant cluster. The service controller deploys the service at the new tenant cluster and manages the lifecycle of the service at the new tenant cluster.

22 Claims, 6 Drawing Sheets

(58) Field of Classification Search
CPC . H04L 41/5054; H04L 41/12; H04L 41/0681; H04L 41/0803; H04L 41/08; H04L 67/51
See application file for complete search history.

(56) References Cited

U.S. PATENT DOCUMENTS

| | | | |
|---|---|---|---|
| 9,225,707 B1* | 12/2015 | de Sousa | H04L 63/08 |
| 10,817,346 B1 | 10/2020 | Culp et al. | |
| 10,841,226 B2 | 11/2020 | Mariappan et al. | |
| 10,951,604 B1* | 3/2021 | Venkatasubramanian | H04L 67/02 |
| 11,055,273 B1* | 7/2021 | Meduri | G06F 16/2358 |
| 2006/0293936 A1* | 12/2006 | Breiter | G06Q 10/06 705/7.25 |
| 2017/0124167 A1* | 5/2017 | Pasupathy | H04L 69/40 |
| 2017/0257432 A1* | 9/2017 | Fu | H04L 67/34 |
| 2019/0238618 A1* | 8/2019 | Bono | G06F 3/0661 |
| 2019/0354354 A1 | 11/2019 | Dubinskii et al. | |
| 2020/0067789 A1 | 2/2020 | Khuti et al. | |
| 2020/0137029 A1 | 4/2020 | Sakthievel et al. | |
| 2020/0192651 A1* | 6/2020 | Mudumbai | H04L 41/14 |
| 2020/0356397 A1 | 11/2020 | Kumatagi et al. | |
| 2020/0404076 A1* | 12/2020 | Mahadevan | H04L 67/34 |
| 2021/0067512 A1 | 3/2021 | Polepalli Yeshwanth et al. | |
| 2021/0124760 A1 | 4/2021 | Klein et al. | |
| 2021/0132974 A1 | 5/2021 | Watt, Jr. et al. | |
| 2021/0234785 A1* | 7/2021 | Green | H04L 43/12 |
| 2021/0240734 A1* | 8/2021 | Shah | G06F 9/5072 |
| 2022/0100766 A1* | 3/2022 | Gugino, II | G06F 8/61 |
| 2022/0130096 A1* | 4/2022 | Zhang | G06F 9/452 |
| 2022/0303271 A1* | 9/2022 | Elsherif | G06F 8/61 |

OTHER PUBLICATIONS

Katie Gamanji, "ClusterAPI—A Guide on How to Get Started", Oct. 24, 2019, 9 pages, retrieved from internet <https://medium.com/condenastengineering/clusterapi-a-guide-on-how-to-get-started-ff9a81262945>.

Kubernetes Sig, "Kubernetes Cluster API", accessed an Aug. 9, 2021, 3 pages, retrieved from internet <https://cluster-api.sigs.k8s.io/introduction.html>.

Red Hat, Inc., "Operator Lifecycle Manager concepts", accessed on Aug. 9, 2021, 6 pages, retrieved from internet <https://docs.openshift.com/container-platform/4.8/operators/understanding/olm/olm-understanding-olm.html>.

* cited by examiner

MANAGEMENT CLUSTER WITH INTEGRATION SERVICE FOR DEPLOYING AND MANAGING A SERVICE IN TENANT CLUSTERS

BACKGROUND

Computing devices may employ containerization at an operating system level and may provide a readily scalable architecture for individual deployment of a plurality of applications that may utilize the same underlying computing resource. In some examples, mutually isolated computing instances, known as containers (or in some examples, by other terms such as virtualization engines or partitions), operate as separate computers from the point of view of applications deployed thereon. While a deployed application may utilize, and be aware of, the resources of its container, it will generally be unaware of the resources of any other container, even where an underlying physical resource is shared. Thus, a computing resource such as a computer, a server, or the like, may have part of its resources allocated to one container and another part allocated to another. An application running within a container may have access to the computing resources allocated to the container, but not to computing resources allocated to other containers. Such isolation of computing resources allows for ease of scalability and accessibility of the same underlying resource by mutually distrusting instances with little additional overhead.

A container manager and deployment system may help automate application deployment, scaling, and/or actively manage and operate an application throughout its full lifecycle. For example, Kubernetes (also referred to as "k8s") is one system that provides a platform for automating deployment, scaling, and/or operations of containers across clusters of host machines (also known as nodes).

BRIEF DESCRIPTION OF DRAWINGS

The following detailed description references the drawings, wherein.

DETAILED DESCRIPTION

Figure 1:
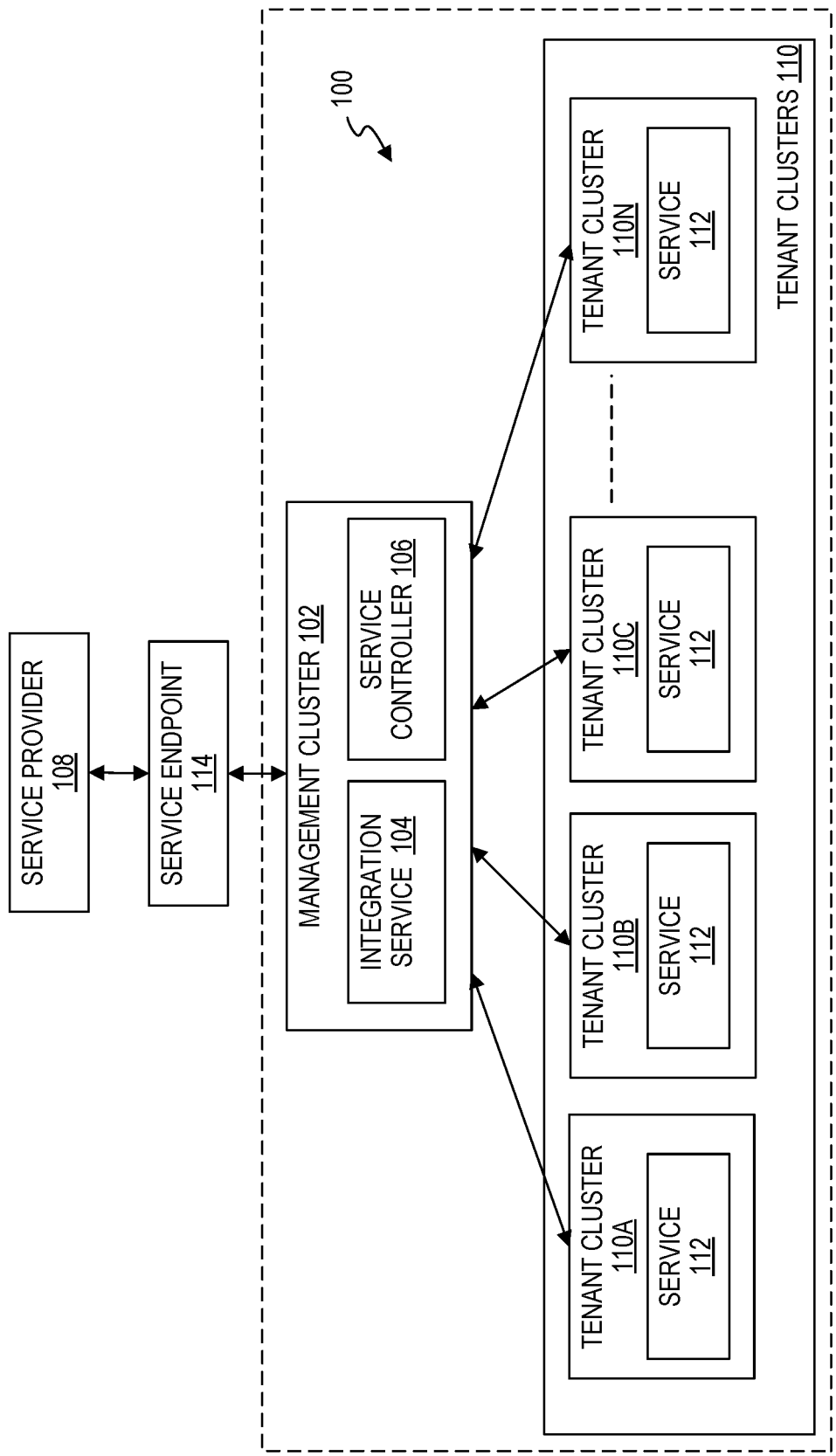
FIG. 1 is a block diagram of a container environment including a management cluster for managing deployment and lifecycle of services in tenant clusters, in accordance with disclosed examples.

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the disclosed examples do not limit the description. The proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. As used herein, the term "includes" means includes but is not limited to, the term "including" means including but not limited to. The term "based on" means based at least in part on.

While certain implementations are shown and described herein, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

As described herein a tenant cluster refers to a set of nodes that run containerized applications. A tenant cluster may include one or more master nodes and many worker nodes. These worker nodes can either be physical computers or virtual machines, depending on the cluster. The tenant cluster may also be referred to as a workload cluster.

As described herein a management cluster refers to a multi-cluster manager in a control plane of a container environment to support provisioning, configuring, deployment, and lifecycle of services at a plurality of tenant clusters. The management cluster may also be referred to as the master management cluster.

With enterprises supporting container management systems, application development and deployment are increasingly being done in containers. Multiple containers may run on a set of nodes, and the set of nodes together form a cluster. Generally, the applications running in the containers in a cluster may have dependencies. For example, the applications running on a cluster may rely on services provided by service providers running on another cluster or may rely upon or interact with the service providers running on an external cloud. In some cases, the service providers may provide monitoring, logging, and/or alerting services and/or applications that may be deployed in the cluster for monitoring the containers. In other cases, the service providers may provide databases, message queuing applications, and object storage services.

Generally, an operator may be deployed at a tenant cluster for deploying and managing lifecycle of the service at the tenant cluster via the service agent. The operator in the tenant cluster may be provided with specific configuration information by the service providers. The configuration information is stored both at the tenant cluster and the service provider end. The service providers identify each tenant cluster uniquely based on the configuration. This allows the service providers to differentiate the data received from multiple tenant clusters. Further, in addition to the configuration information, every tenant cluster may be provided with credentials (e.g., username and password). The service agents in the tenant cluster use the credentials to communicate with the service provider. In some cases, the operator may communicate using the credentials and the configuration information to a portal of the service provider for completing the registration of the tenant cluster with the service provider. In other cases, the operator may communicate with the service provider running on another cluster to complete the registration of the tenant cluster with the service provider.

The configuration information is generally generated for each tenant cluster and provided to the operator of the tenant cluster by the service provider. However, there is currently no standardized way for providing the configuration information to the tenant cluster. The configuration information required for the tenant cluster may be received using different mechanisms. The configuration information may be a Yet Another Markup Language (YAML) file or a JavaScript Object Notation (JSON) file provided by the service provider on request. In some cases, the service provider running on another cluster may generate configuration information and credentials for the tenant cluster, and provide them to the operator of the newly generated tenant cluster. In other cases, the configuration information and the credentials may be provided by a user after registering the tenant cluster on a Software as a Service (SaaS) portal of a cloud service provider. Further, there is no solution to automatically provide live configuration information to operators of newly generated clusters. In existing implementations, one operator is required per tenant cluster. Further, in cases of changes in credentials provided to the tenant clusters, the update of the credentials at multiple tenant clusters may become challenging. Any change in the credentials would necessitate an update of each tenant cluster individually with new credentials.

Therefore, in accordance with the aspects of the present disclosure, a management cluster in a container environment is provided that may obviate one or more of the challenges mentioned hereinabove. The management cluster includes an integration service that is coupled to a service controller. The integration service provides configuration information to the service controller for deploying a service at a new tenant cluster. The configuration information may include access credentials and the tenant cluster-specific configuration. The service controller uses the configuration information to deploy a service in the tenant cluster. The management cluster may provision, deploy, and manage the lifecycle of a service provided by a service provider in multiple tenant clusters in an automated, dynamic, consistent, and efficient manner using the service controller and the integration service. Further, the management cluster manages upgrades to the service at multiple tenant clusters using the integration service.

As the integration service provides the access credentials and the tenant cluster-specific configuration information to the service controller for the new tenant cluster, the deployment of the service is performed using dynamically received data from the integration service. Further, the management cluster may store privileged credentials (also referred to as secrets) required for communication with the service provider. The privileged credentials are provided and managed by the service provider. As these privileged credentials are stored at the management cluster and not provided to individual tenant clusters, operational overhead related to managing the security, and rotation of the privileged credentials may be avoided.

Referring now to the figures, FIG. 1 is a block diagram of a container environment 100 including a management cluster 102 for managing deployment and lifecycle of a service 112 in a plurality of tenant clusters. The container environment 100 may be associated with a vendor providing infrastructure and services to the plurality of tenant clusters. The services provided by the container environment 100 may include, but are not limited to, virtual computer systems, block-level data storage, cryptography services, on-demand data storage, notification services, web services, authentication services, policy management services, task services, and/or other such services.

The container environment 100 may be managed by a container orchestration platform (e.g., Kubernetes) for scheduling and automating the deployment, management, and scaling of containerized applications. The container environment 100 may include a control plane and compute machines. The compute machines may include a set of worker nodes running applications in containers. A tenant cluster may include one master node (in the control plane) and several worker nodes. These worker nodes can either be physical computers (infrastructure such as e.g., servers, storage appliances, desktop computers, laptop computers, hyperconverged appliances, networking devices, etc.) or virtual machines running on physical computers, depending on the cluster. Several pods may be co-located in each of the worker nodes, and one or more containers reside within each of the pods. The containers may be co-located on the host machine (machine where containers are running, i.e., worker node), and may share resources.

The tenant clusters 110A, 110B, 110C . . . 110N (also referred to collectively as tenant clusters 110) may be clusters generated by a tenant (i.e., a customer) registered with the management cluster 102. The tenant clusters 110 may be associated with specific resource subsystems and each tenant cluster is logically isolated from the other tenant clusters. In some cases, each tenant cluster may be defined for a user/entity of the tenant.

The management cluster 102 is defined in the control plane to manage the multiple tenant clusters 110. The management cluster 102 may be a server that communicates and manages the multiple tenant clusters 110 in the container environment 100 using Application Programming Interfaces (APIs). The management cluster 102 is defined in the control plane to support the provisioning, configuring, deployment, and lifecycle of services at a plurality of tenant clusters 110. The management cluster 102 may include an integration service 104 and a service controller 106 for facilitating the deployment and management of services and/or applications that are being used by workloads in the tenant cluster 110, as will be described below.

In some implementations, some or all of the container environment 100 may be provided to a user or user's organization by a vendor for consumption as-a-service by the user or user's organization in a pay-per-use financial model. For example, the vendor may deliver physical hardware-based infrastructure (e.g., servers, storage appliances, desktop computers, laptop computers, hyperconverged appliances, networking devices, etc.) to a data center or colocation associated with the user or user's organization (thus forming a private cloud), and the infrastructure may connect (e.g., via a gateway operated by the vendor, which also may be installed at the data center or colocation) to a cloud-based portal operated by the vendor whereby the infrastructure can be controlled and workloads managed on the infrastructure. In some cases, the service provider 108 may be the same as or different from the vendor. In some implementations, the management cluster 102 may be located in the gateway or at the cloud-based portal.

The integration service 104, the service provider 108, and the tenant clusters 110 communicate over a communication network that may be one or more of Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet.

In some examples, the service 112 may include a storage service, a database service, message queuing application, and object storage service, monitoring service, and logging service. In some cases, the service provider 108 may be the same vendor as a vendor providing the infrastructure (e.g., hardware-based servers, container orchestration platform, management services, etc.) in the container environment 100, or in other words, a first-party vendor. In some cases, the service provider 108 may be a different vendor than the vendor providing such infrastructure, also referred to as a "third-party vendor."

In some examples, the integration service 104 may be running on a server or may be implemented as software (e.g., a set of executable instructions) at the management cluster 102 for providing information required for deployment of the service 112 at the tenant clusters 110. The integration service 104 may be executing in a hardware-based management cluster 102. The integration service 104 is communicatively coupled to the service controller 106. The service controller 106 may be a customized controller for deploying and managing services in the tenant clusters 110 based on custom resources (CRs) defined in the management cluster 102. The service controller 106 may communicate with the integration service 104 for receiving tenant cluster-specific configuration information from the integration service 104. Although FIG. 1 depicts the management cluster 102 with the integration service 104 and service controller 106, it should be understood that the management cluster 102 may include other container orchestration components (e.g., Kubernetes components) such as Application Programming Interface (API) server, scheduler, and a controller to manage workloads across the worker nodes in multiple tenant clusters 110.

The integration service 104 in the management cluster 102 communicates with a service endpoint 114 of the service provider 108 to receive the tenant cluster-specific configuration information. The service endpoint 114 may be a Uniform Resource Locator (URL) provided by the service provider 108. The service endpoint 114 exposes different APIs associated with different functions of the service 112. The integration service 104 communicates with the service endpoint 114 of the service provider 108 for receiving the tenant cluster-specific configuration information for deploying the service 112 using an API associated with the service endpoint 114. Although FIG. 1 depicts a single integration service 104 in communication with a single service provider 108 for receiving tenant cluster-specific configuration information, it should be understood, in other cases, the management cluster 102 may be configured to support multiple integration services for the deployment of multiple services and applications from multiple service providers.

The management cluster 102 may define a REST Application Programming Interface (API) specification for receiving data from the integration service 104 for the deployment of the service 112. The REST API for the integration service 104 may be defined as per the REST API specification provided by the management cluster 102. The integration service 104 may be unique for each service provider 108.

During operation, if the service controller 106 detects that a new tenant cluster has been generated by the tenant (e.g., for the purposes of illustration, consider tenant cluster 110C to be a newly added tenant cluster), the service controller 106 makes a call to the REST API associated with the integration service 104 of the service 112. In some cases, where multiple services are to be deployed in the new tenant cluster 110C, the service controller 106 may call REST APIs of integration services associated with the multiple services. The integration service 104 communicates with the service endpoint 114 of the service provider 108 for receiving tenant cluster-specific configuration information. The tenant cluster-specific configuration information is provided by the service provider 108 for the new tenant cluster 110C. In an example, the tenant cluster-specific configuration information may include an integration identity (e.g., universally unique identifier (UUID)) generated for the new tenant cluster 110C by the service provider 108. In another example, the tenant cluster-specific configuration information may include certificates that authenticate the new tenant cluster 110C to the service provider 108. In some cases, the integration service 104 may be configured by the service provider 108 to communicate with a certificate authority (CA) associated with the service provider 108 for receiving the certificates for the new tenant cluster 110C.

Further, the integration service 104 generates access credentials for the service 112 being deployed in the new tenant cluster 110C, which may be used by the new tenant cluster 110C to communicate with the service provider 108. The integration service 104 provides the tenant cluster-specific configuration information and the generated access credentials to the service controller 106.

Figure 2:
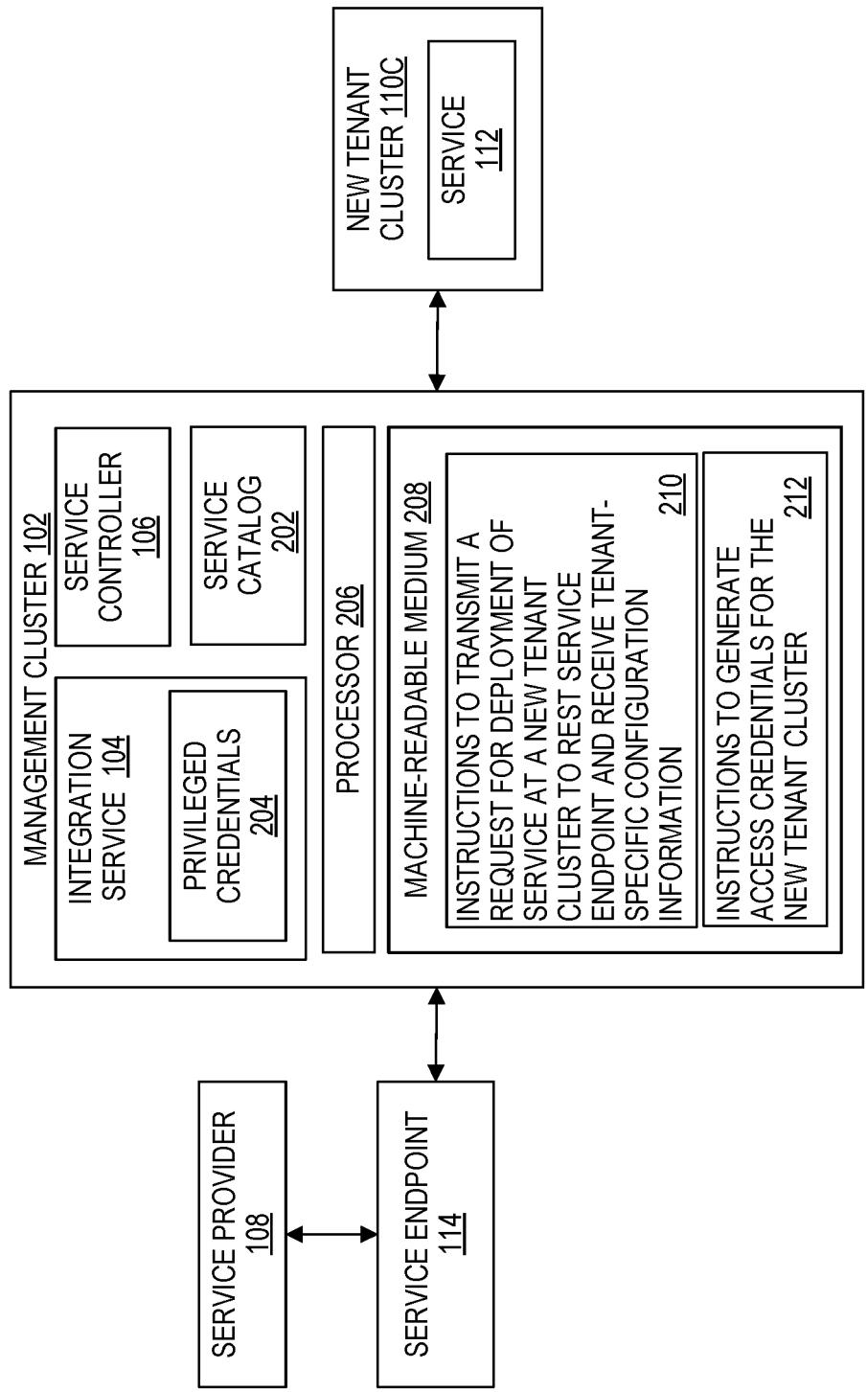
FIG. 2 is a block diagram of an example management cluster including an integration service and a service controller, in accordance with disclosed examples.

FIG. 2 is a block diagram of an example management cluster 102 including the integration service 104 and the service controller 106, in accordance with disclosed examples. In addition to the integration service 104 and the service controller 106, the management cluster 102 may include a service catalog 202. The service catalog 202 may be provided by the service provider 108 as per a specification defined by the management cluster 102. The specification includes details required in the service catalog 202 for the deployment of the service 112. In an example, the service catalog 108 may be provided as a YAML file by the service provider 108. The service catalog 202 is used by the service controller 106 for deploying and managing the service 112 at the tenant clusters 110. In some examples, the information in service catalog 202 may include an address of the service endpoint 114 of the service provider 108 for providing service 112, an application manifest, and a tenant cluster namespace name. The application manifest may include information about the location of helm charts and helm chart versions to be used for deploying the service 112 in the new tenant cluster 110C. The tenant cluster namespace name is added to the service catalog 202 by the service controller 106 when the new tenant cluster namespace is generated in the container environment 100.

The service catalog 202 may be provided for the service 112 provided by the service provider 108. The service catalog 202 may be provided as an input to the service controller 106 for deploying the service 112 in the tenant clusters 110. For the service 112 deployed in the tenant clusters 110, the integration service 104 and the service catalog 202 associated with the service provider 108 may be provided in the management cluster 102 by the service provider 108 as the REST API specification and the YAML specification respectively. Further, in addition to the service catalog 202, a service manager (not shown) may be present at the management cluster 102. The service manager may be used for tracking the status of deployment of the service 112 at the tenant clusters 110.

In an example, the service 112 may be a Relational Database Service (RDS) provided by an external service provider such as a Web Service provider and may be defined by a service catalog 202 in the management cluster 102. The service catalog 202 may include RDS-specific information regarding namespace metadata, version of the service 112, database instance class, database engine, allocated storage, etc.

In some cases, the service catalog 202 may provide information related to deployment of the service 112 provided by the service provider 108. In some other cases, the service catalog 202 may provide information related to multiple services provided by the service provider 108. The service controller 106 may use the information present in the service catalog 202 along with information from the integration service to deploy and manage the lifecycle of the service 112 at multiple tenant clusters 110.

In FIG. 2, the service controller 106 communicates with the integration service 104 for requesting and receiving information for deploying and managing the lifecycle of the service 112. On the generation of the new tenant cluster 110C, the service controller 106 may fetch the details of the service 112 to be deployed from the service catalog 202. The service catalog 202 may include the REST API of the integration service 104, the location of the helm charts used for deploying the services, and the target cluster namespace name in which the service 112 is to be deployed. The target cluster namespace name is the name of the cluster namespace of the new tenant cluster 110C. The service controller 106 makes a call to the REST API of the integration service 104 to receive configuration information required for deployment of the service 112 at the new tenant cluster 110C. In some cases, the service controller 106 makes a call to REST APIs of multiple integration services for deployment and management of multiple services in the new tenant cluster 110C. The configuration information includes tenant cluster-specific configuration information and access credentials. The integration service 104 communicates with the service endpoint 114 of the service provider 108 for receiving tenant cluster-specific configuration information and generates the access credentials for the new tenant cluster 110C.

In some examples, the integration service 104 may include privileged credentials 204 provided by the service provider 108. The privileged credentials 204 may include API keys, tokens, username passwords, etc. used for communication with the service provider 108. In some cases, the privileged credentials 204 may be encrypted files stored in the management cluster 102. In other cases, the privileged credentials 204 may be stored as part of the service catalog 202.

The privileged credentials 204 may be managed by the integration service 104. The integration service 104 in the management cluster 102 may be located between the service provider 108 and the tenant clusters 110 in the container environment 100. In Kubernetes for example, the privileged credentials 204 may be objects that store restricted data in a YAML (or JSON file) in the management cluster 102 or service catalog 202. As the privileged credentials 204 are stored at the management cluster 102 and not at individual tenant clusters 110, the management of the privileged credentials 204, including key rotation or revocation, becomes easier.

In some examples, the integration service 104 may be implemented as software (e.g., a set of executable instructions) that is executable by a processor 206. The processor 206 may execute the set of instructions stored in a non-transitory machine-readable medium 208. The processor 206 may be implemented as one or more microprocessors, microcomputers, microcontrollers, digital signal processors, central processing units, state machines, logic circuitries and/or any devices that manipulate signals based on operational instructions. The machine-readable medium 208 may include any non-transitory computer-readable medium including, for example, volatile memory (e.g., RAM), and/or non-volatile memory (e.g., EPROM, flash memory, a hard disk drive, etc.). The term non-transitory does not encompass transitory propagating signals.

The processor 206 may be configured to execute instructions 210 and 212 (e.g., programming or software code) stored in the machine-readable medium 208 to perform the functions of the integration service 104. The instructions 210 when executed by the processor 206, cause the integration service 104 to transmit a request for deployment of service 112 at a new tenant cluster, for example, tenant cluster 110C. In some examples, the integration service 104 may be triggered to transmit the request upon creation of the new tenant cluster 110C. The request for deployment of the service 112 may be transmitted to the service endpoint 114 of the service provider 108. The integration service 104 may communicate with the service endpoint 114 of the service provider 108 using the privileged credentials 204 to request the tenant cluster-specific configuration information. Although the same version of the service 112 may be deployed at the tenant clusters 110, the tenant cluster-specific configuration information for each tenant cluster may be different to differentiate the data received from the tenant clusters 110C. The integration service 104 may transmit a request for deployment of the service 112 at the new tenant cluster 110C. The request may include information specific to the new tenant cluster 110C such as the tenant cluster namespace name, and the number of containers running in the tenant cluster. The integration service 104 receives the tenant cluster-specific configuration information from the service provider 108 via the service endpoint 114. The tenant cluster-specific configuration information is stored both at the service provider 108 and the tenant clusters 110. In an example the tenant cluster-specific configuration information may include an integration identity for the new tenant cluster 110C. In another example, the tenant cluster-specific configuration may include certificates that authenticate the tenant clusters to the service provider 108.

Instructions 212 when executed by the processor 206 cause the integration service 104 to generate access credentials for the new tenant cluster 110C. The access credentials may be used by the new tenant cluster to communicate with the service provider. The integration service 104 generates the access credentials and provides them to service controller 106 that deploys the service 112 in the new tenant cluster 110C. The access credentials are used by the new tenant cluster 110C to communicate with the service provider 108. The access credentials may include Identity and Access Management (IAM) details generated for the new tenant cluster 110C. Unlike operator-based deployment of service in which all the tenant clusters are using credentials provided by the service provider 108, the generation of access credentials allows the management cluster 102 to manage the access credentials for tenant clusters individually.

The access credentials and the tenant cluster-specific configuration information are provided by the integration service 104 to the service controller 106. The service controller 106 may use the tenant cluster-specific configuration information, the access credentials, and information associated with the service provider 108 in the service catalog 202 for deploying the service 112 at the new tenant cluster 110C. Although FIG. 2 shows two instructions 210 and 212, it should be understood that several instructions may be stored in the machine-readable medium 208 and executed by the processor 206 for performing other functions of the integration service 104.

The service controller 106 deploys and manages the lifecycle of the service 112 at the tenant clusters 110 using the service catalog 202 of the service provider 108, the tenant cluster-specific configuration information, and access credentials provided by the integration service 104. This type of deployment allows the management cluster 102 to deploy, track, and update the service 112 at multiple tenant clusters 110. For example, in case there is an update in the service 112 (e.g., a new version of service 112), the service controller 106 can automatically update the service 112 in all the tenant clusters 110.

Figure 3:
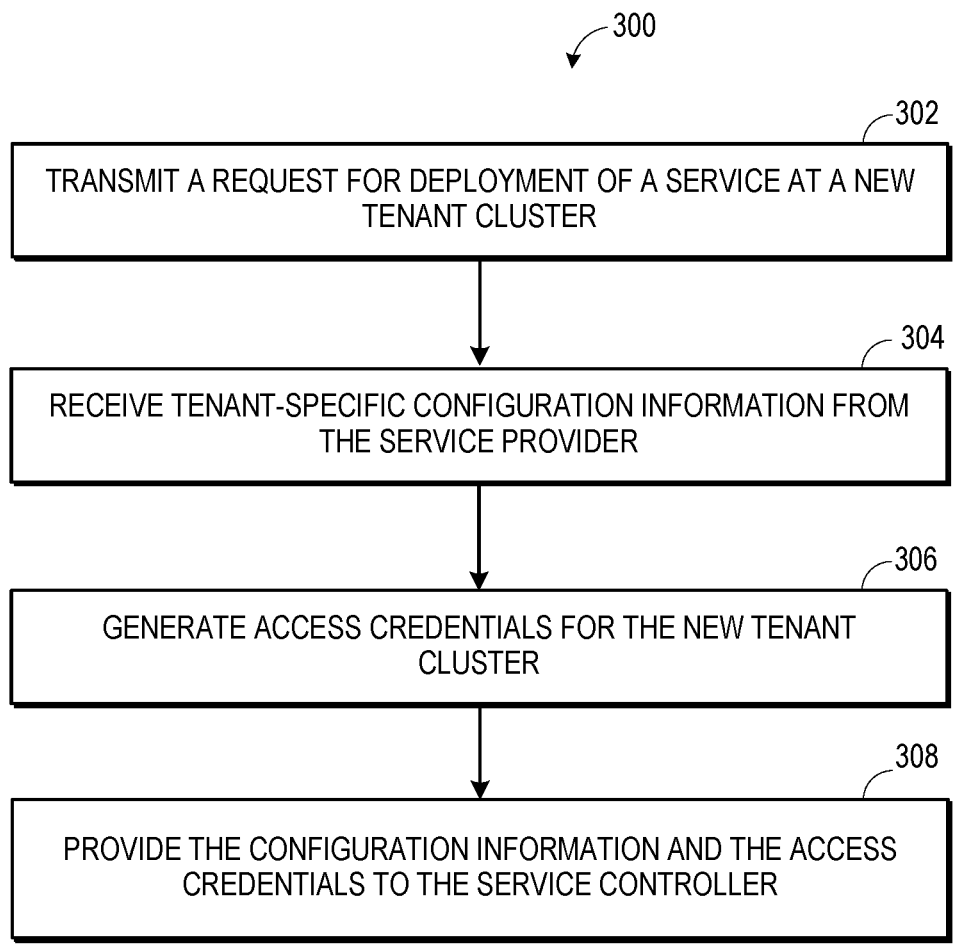
FIG. 3 is a flowchart depicting a method including operations performed by an integration service for enabling the deployment of a service in a new tenant cluster, in accordance with disclosed examples.
Figure 4:
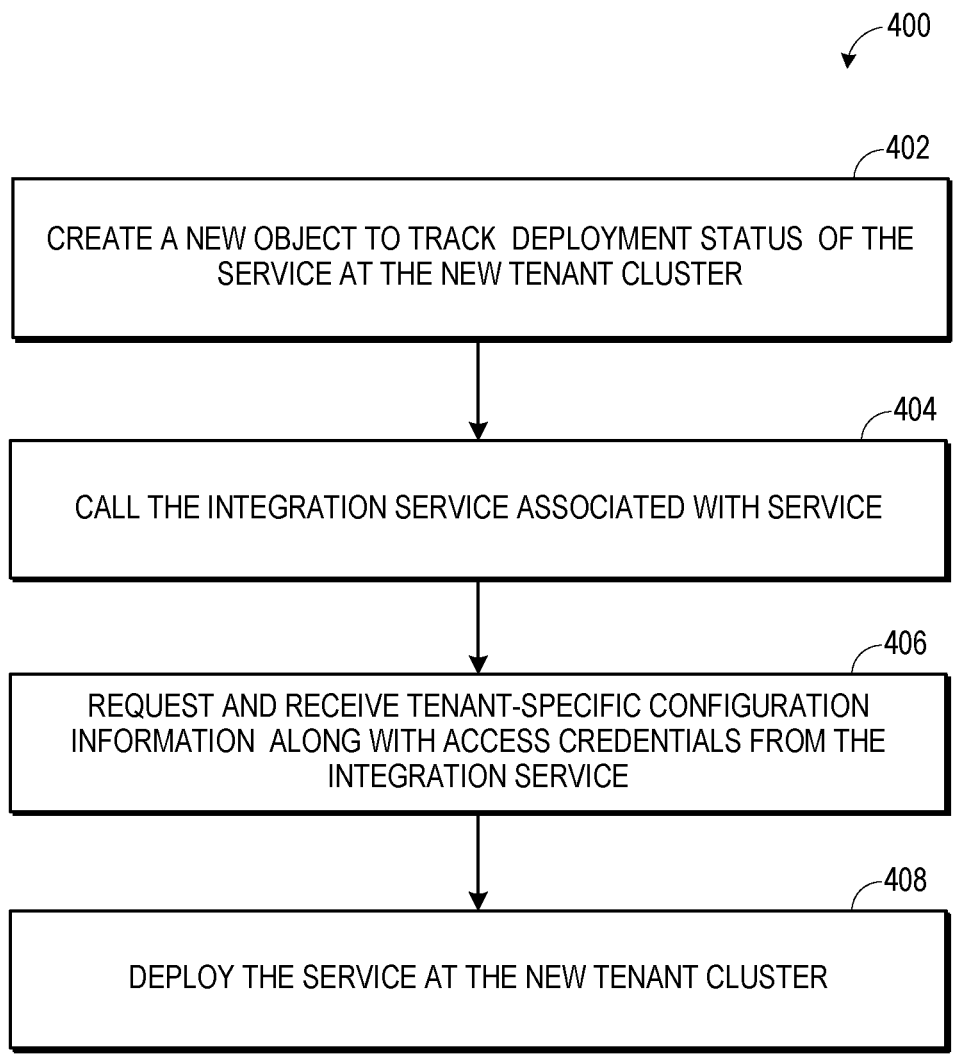
FIG. 4 is a flowchart depicting a method including operations performed by a service controller for deploying a service at a new tenant cluster, in accordance with disclosed examples.

FIGS. 3 and 4 are flow diagrams depicting various example methods. In some implementations, one or more blocks of the methods may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of the methods may be combined.

FIG. 3 is a flowchart depicting a method 300 including operations performed by an integration service for enabling the dynamic deployment of a service in a new tenant cluster, in accordance with disclosed examples. The method 300 depicted in FIG. 3 may be implemented in the form of executable instructions stored on a machine-readable medium and executed by the processor, such as the machine-readable medium 208 and processor 206 as shown in FIG. 2. The method 300 may be performed by the integration service 104 of FIGS. 1 and 2 for enabling the deployment of the service 112 in the new tenant cluster 110C. FIG. 3 will be explained in conjunction with FIGS. 1 and 2.

At block 302, the integration service 104 may transmit a request for deploying the service 112 at the new tenant cluster 110C. The request for deployment of the service 112 may be transmitted in response on the generation of a new tenant cluster 110 by the service controller 106. The request is transmitted to the service endpoint 114 of the service provider 108. The service providers that wish to provide services to the tenant clusters 110 may register and deploy their integration services in the management cluster 102. The REST API of the integration services may be defined as per the API specification defined by the management cluster 102. The REST API of the integration service 104 of a service 112 may be stored in the service catalog 202 or at the storage of the management cluster 102.

At block 304, the integration service 104 may receive the tenant cluster-specific configuration information from the service endpoint 114 in response to the request. In some cases, the tenant cluster-specific configuration information may include an integration identity for the new tenant cluster 110C. Further, the new tenant cluster 110C may be registered at the service provider 108 using the tenant cluster-specific configuration information of the new tenant cluster 110C, and the version of the service being deployed. In some other cases, the tenant cluster-specific configuration may include certificates that authenticate the new tenant cluster to the service provider. The tenant cluster-specific configuration information may be part of configuration information used for the deployment of the service 112 at the new tenant cluster 110C.

At block 306, the integration service 104 generates access credentials for the new tenant cluster 110C. The access credentials may be used to configure the service at the new tenant cluster 110C for communicating with the service provider 108. In an example, the access credentials may include the IAM information such as secrets, usernames, access keys, that allow the new tenant cluster 110C to connect to the service provider 108. The integration service 104 may be responsible for the generation and management of the lifecycle of the access credentials generated for the new tenant cluster 110C.

At block 308, the integration service 104 may provide the access credentials and the tenant cluster-specific configuration information to the service controller 106 for deploying the service 112 in the new tenant cluster 110C. Once the service 112 is deployed, the new tenant cluster 110C may communicate with the service provider 108. In case the service 112 is a monitoring service provided by a third-party service provider, there may be an endpoint in the new tenant cluster 110C for metrics collection and auto-discovery.

As the integration service 104 provides the service controller 106 with the tenant cluster-specific configuration information and access credentials dynamically, the deployment of the service 112 and management of the service 112 in the tenant cluster becomes easier. For example, in case of any change in the service catalog 202 (updated by the service provider 108 or by a user with the privileged credentials), the service controller 106 may call the integration service 104 to redeploy and/or update the service 112 in the tenant cluster 110 dynamically. As the integration service 104 stores both the tenant cluster-specific configuration information and access credentials for each tenant cluster, any update or redeployment can be performed using the tenant cluster-specific configuration information and access credentials.

FIG. 4 is a flowchart depicting a method 400 including operations performed by a service controller for deploying a service at a new tenant cluster, in accordance to disclosed examples. The method 400 depicted in FIG. 4 may be implemented in the form of executable instructions stored on a machine-readable medium and executed by a processor. For example, method 400 may be performed by the service controller 106 of FIG. 1 for enabling the deployment of the service 112 in the new tenant cluster 110C. FIG. 4 will be explained in conjunction with FIGS. 1 and 2.

At block 402, the service controller 106 may create an object in the management cluster 102 for tracking a deployment status of the service 112 at the new tenant cluster 110C. The object is created by the service controller 106 upon generation of a new tenant cluster 110C. In some cases, the service controller 106 may create multiple objects corresponding to multiple services that are being deployed in the new tenant cluster 110C. The objects created in the management cluster 102 are updated based on changes in tenant clusters 110 or changes in the service catalogs at the management cluster 102.

Along with object generation for tracking, the service controller 106 may retrieve information required for deployment of the service 112 at the new tenant cluster 110C. For example, the service controller 106 may retrieve Helm Charts that are used for deploying the service 112 at the new tenant cluster 110C.

At block 404, the service controller 106 calls the REST API of the integration service 104 associated with the service 112 to be deployed. The integration service 104 communicates with the service endpoint 114 that supports the service 112 provided by the service provider 108. In an example, the service controller 106 makes a call to REST API associated with the integration service 104 to receive the tenant cluster-specific configuration information and the access credentials for deploying the service 112 in the new tenant cluster 110C. In some cases where multiple service catalogs associated with multiple services are present in the management cluster 102, the service controller 106 may make a call to REST APIs of integration services corresponding to the multiple services for receiving tenant-specific configuration information for the multiple services to be deployed.

At block 406, the service controller 106 requests and receives the tenant cluster-specific configuration information along with the access credentials from the integration service 104. The calling of the REST API associated with integration service 104 of the service by the service controller 106 for the tenant cluster-specific configuration information and the access credentials, and receipt of the tenant cluster-specific configuration information and the access credentials leads to the dynamic deployment of the service 112 at new tenant cluster 110C.

At block 408, the service controller 106 deploys the service at the new tenant cluster 110C using information present in the service catalog 202 and information received from the integration service 104. The service controller 106 deploys the service 112 at the new tenant cluster 110C. Once deployed, the service controller 106 may manage the lifecycle of service 112 at the new tenant cluster 110C. In an example, if usage of service 112 is discontinued and the service catalog 202 associated with the service 112 may be deleted, the service controller 106 may detect the deletion of the service catalog 202 and delete the service 112 at the tenant clusters 110. In another example, in cases when there are changes in or of the version of the service 112 deployed at the tenant cluster 110, the service controller 106 may upgrade and/or redeploy the service 112 at the tenant clusters 110.

The service controller 106 may be configured to monitor and detect changes in the service catalog 202 and perform the upgrade and/or redeployment of the service 112. The service controller 106 may call the REST API of the integration service 104 to perform the upgrade and/or redeployment of the service 112. The management cluster 102 with the integration service 104 and the service catalog 202 allows the service controller 106 to manage the lifecycle of the service 112 across multiple tenant clusters 110.

Figure 5:
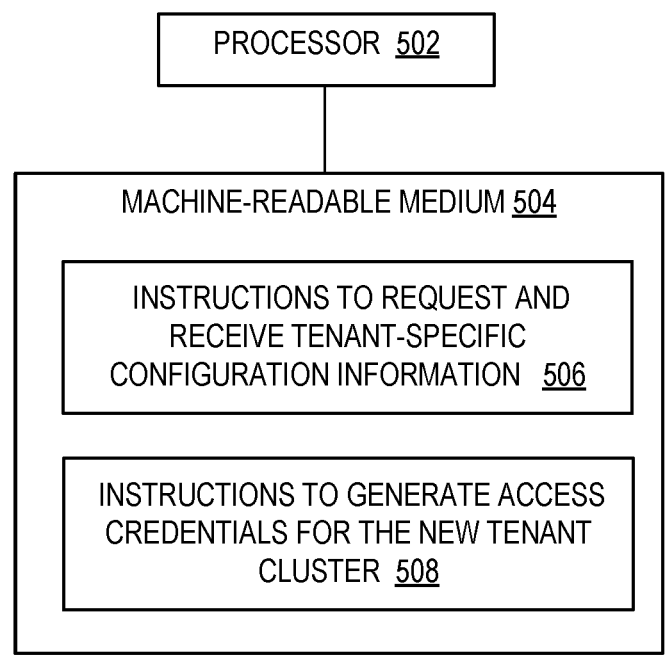
FIG. 5 is a block diagram depicting a processor coupled to a machine-readable medium storing executable instructions for providing dynamic information for the deployment of service, in accordance with disclosed examples.

FIG. 5 is a block diagram depicting a processor 502 coupled to a machine-readable medium 504 storing executable instructions to provide dynamic information for the deployment of service 112 at tenant clusters 110, in accordance to disclosed examples. The machine-readable medium 504 may be non-transitory and is alternatively referred to as a non-transitory machine-readable medium 504. In some examples, the machine-readable medium 504 may be accessed by processor 502. As described in detail herein, the machine-readable medium 504 may be encoded with executable instructions 506 and 508 to dynamically provide the information for deploying the service 112. Although not shown, in some examples, the machine-readable medium 504 may be encoded with certain additional executable instructions to perform operations at one or more blocks in the method 300 described in FIG. 3, and/or any other operations performed by the integration service 104, without limiting the scope of the present disclosure. The processor 502 and the machine-readable medium may be similar to the processor 206 and the machine-readable medium 208 respectively, as described in FIG. 2.

In some examples, the processor 502 may fetch, decode, and execute the instructions 506 and 508 stored in the machine-readable medium 504 to dynamically provide the information for deploying a service 112 in a new tenant cluster 110C. In certain examples, as an alternative or in addition to retrieving and executing the instructions 506 and 508, the processor 502 may include at least one integrated circuit, other control logic, other electronic circuits, or combinations thereof for performing the functionalities of the integration service 104.

The instructions 506, when executed by the processor 502, may cause the integration service 104 to transmit a request to the service endpoint 114 of the service provider 108 to receive tenant cluster-specific configuration information. The integration service 104 may transmit a request for deployment of the service 112 at the new tenant cluster 110C using the service endpoint 114 associated with the service provider 108, and receive the tenant cluster-specific configuration information from the service provider 108. Further, instructions 508, when executed by the processor 502, may cause the integration service 104 to generate access credentials for the new tenant cluster 110C. The access credentials and the tenant cluster-specific configuration information generated by the integration service 104 may be used by the service controller 106 during the deployment of the service 112 as per an application manifest.

Figure 6:
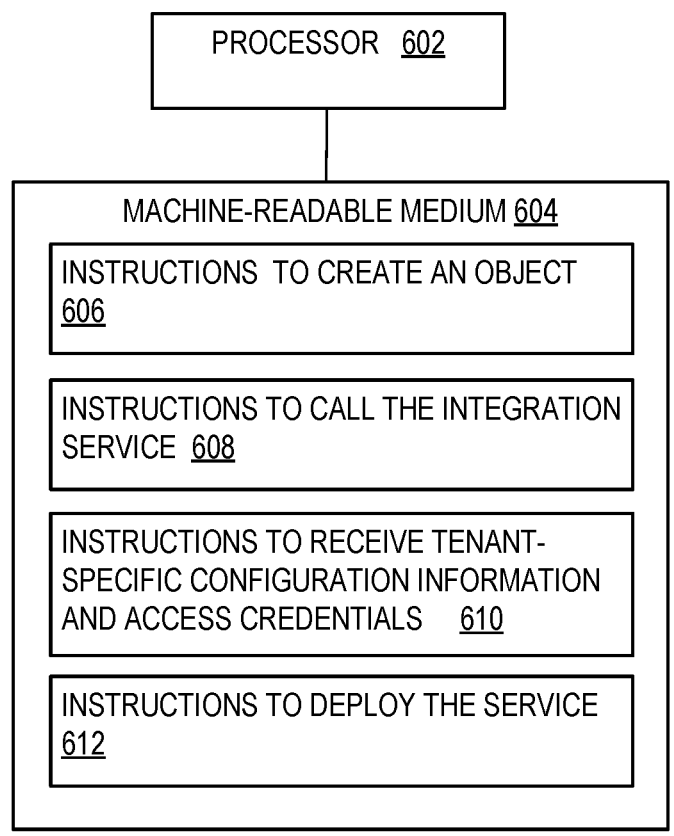
FIG. 6 is a block diagram depicting a processor coupled to a machine-readable medium storing executable instructions for deploying the service in the new tenant cluster, in accordance with disclosed examples.

FIG. 6 is a block diagram depicting a processor 602 coupled to a machine-readable medium 604 storing executable instructions for deploying the service 112 in the new tenant cluster 110C, in accordance with disclosed examples. The machine-readable medium 604 may be non-transitory and is alternatively referred to as a non-transitory machine-readable medium 604. In some examples, the machine-readable medium 604 may be accessed by processor 602. As described in detail herein, the machine-readable medium 604 may be encoded with executable instructions 606, 608, 610 and 612 (hereinafter collectively referred to as instructions 606-612) to deploy the service 112 in the new tenant cluster 110C using the tenant cluster-specific configuration information provided by the integration service 104. Although not shown, in some examples, the machine-readable medium 604 may be encoded with certain additional to perform operations at one or more blocks in the method 400 described in FIG. 4, and/or any other operations performed by the service controller 106, without limiting the scope of the present disclosure.

In some examples, the processor 602 may fetch, decode, and execute the instructions 606-610 stored in the machine-readable medium 604 to deploy the service 112 in the new tenant cluster 110C. In certain examples, as an alternative or in addition to retrieving and executing the instructions 606-610, the processor 602 may include at least one integrated circuit, other control logic, other electronic circuits, or combinations thereof for performing the functionalities of the service controller 106.

The instructions 606, when executed by the processor 602, may cause the service controller 106 to create an object in the management cluster 102 for tracking a deployment status of a new tenant cluster in the management cluster 102. The object is created by the service controller 106 upon generation of a new tenant cluster 110C by the tenant. The service controller 106 may create multiple objects corresponding to multiple services that are being deployed in the new tenant cluster 110C. The objects may be used for determining if the service is deployed for a tenant cluster or not. Further, the instructions 608, when executed by the processor 602, may cause the service controller 106 to call the REST API of the integration service 104 associated with the service 112 to be deployed. The instructions 610, when executed by the processor 602, may cause the service controller 106 to request and receive tenant cluster-specific configuration information and access credentials from the integration service 104. Further, the instructions 612, when executed may cause the service controller 106 to deploy the service 112 at the new tenant cluster 110C using the service catalog 202 associated with the service 112, the tenant cluster-specific configuration information, and the access credentials.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementations may be practiced without some or all of these details. Other implementations may include modifications, combinations, and variations from the details discussed above. It is intended that the following claims cover such modifications and variations.

We claim:

1. A method comprising:
receiving, from a service controller at an integration service executing in a hardware-based management cluster, an indication of creation of a new tenant cluster in a container environment;
in response to the indication of the creation of the new tenant cluster, transmitting, by the integration service to a service endpoint of a service provider, a request for deployment of a service associated with the service provider at the new tenant cluster;
in response to the request, receiving, by the integration service, tenant cluster-specific configuration information from the service provider that has registered the service at the service provider using the tenant cluster-specific configuration information;
generating, by the integration service, access credentials for the new tenant cluster;

providing, by the integration service to the service controller, the tenant cluster-specific configuration information and the access credentials; and
deploying and managing, by the service controller, the service at the new tenant cluster using the tenant cluster-specific configuration information, the access credentials, and a service catalog associated with the service at the management cluster, wherein the service catalog comprises an application manifest including information regarding a related set of resources to be used for deploying the service in the new tenant cluster, and wherein the service at the new tenant cluster is to use the access credentials from the integration service and received at the service controller to communicate with the service provider.

2. The method of claim 1, wherein the service catalog is provided by the service provider, and wherein the service catalog is provided pursuant to an Application Programming Interface (API) specification provided by the management cluster.

3. The method of claim 1, wherein the service catalog stores an address of the service endpoint of the service provider, and a tenant cluster namespace name for deploying the service.

4. The method of claim 1, further comprising:
detecting, by the service controller, a change in the service catalog; and
updating, by the service controller, the service at the new tenant cluster in accordance with the change in the service catalog.

5. The method of claim 1, further comprising receiving, at the integration service, a Representational State Transfer (REST) Application Programming Interface (API) call from the service controller requesting the tenant cluster-specific configuration information for deploying the service at the new tenant cluster, wherein a REST API associated with the integration service is called by the service controller in response to generation of the new tenant cluster.

6. The method of claim 5, wherein the REST API associated with the integration service is implemented and deployed at the management cluster by the service provider pursuant to an API specification provided by the management cluster.

7. The method of claim 1, further comprising:
receiving, by the integration service, privileged credentials associated with the service provider, wherein the privileged credentials are stored at the management cluster; and
using, by the integration service, the privileged credentials to communicate with the service provider.

8. The method of claim 1, further comprising tracking, by the management cluster, a status of deployment of the service at a plurality of tenant clusters, wherein the new tenant cluster is among the plurality of tenant clusters.

9. A system comprising:
a management cluster comprising an integration service and a service controller, wherein the integration service is to:
receive, from the service controller, an indication of creation of a new tenant cluster in a container environment;
in response to the indication of the creation of the new tenant cluster, transmit, from the integration service to a service endpoint of a service provider, a request for deployment of a service associated with the service provider at the new tenant cluster;

in response to the request, receive, at the integration service, tenant cluster-specific configuration information from the service provider;

generate access credentials for the new tenant cluster, wherein the new tenant cluster is among a plurality of tenant clusters; and provide, from the integration service to the service controller, the tenant cluster-specific configuration information and the access credentials, wherein the service controller is to:

deploy the service at the new tenant cluster using the tenant cluster-specific configuration information, the access credentials, and a service catalog associated with the service in the management cluster, wherein the service catalog comprises an application manifest including information regarding a related set of resources to be used for deploying the service in the new tenant cluster, and wherein the service at the new tenant cluster is to use the access credentials from the integration service and received at the service controller to communicate with the service provider; and manage a lifecycle of the service at the new tenant cluster.

10. The system of claim 9, wherein the service catalog is provided by the service provider, and wherein the service catalog is provided pursuant to an Application Programming Interface (API) specification provided by the management cluster.

11. The system of claim 9, wherein the service catalog stores an address of the service endpoint, and a tenant cluster namespace name for deploying the service.

12. The system of claim 9, wherein the service controller is to:

detect a change in the service catalog; and upgrade the service at the new tenant cluster in accordance with the change in the service catalog.

13. The system of claim 9, wherein the integration service is to:

receive, at the integration service, privileged credentials that are associated with the service provider, wherein the privileged credentials are stored in the management cluster; and use, by the integration service, the privileged credentials to communicate with the service provider.

14. The system of claim 9, wherein the service controller is to:

make a Representational State Transfer (REST) Application Programing Interface (API) call to the integration service upon generation of the new tenant cluster; and receive the tenant cluster-specific configuration information and the access credentials from the integration service in response to the REST API call.

15. The system of claim 14, wherein a REST API associated with the integration service is implemented by the service provider and deployed at the management cluster pursuant to an API specification provided by the management cluster.

16. The system of claim 9, wherein the management cluster is to track a status of deployment of the service at the plurality of tenant clusters.

17. A non-transitory machine-readable medium storing instructions that upon execution cause a management cluster to:

receive, from a service controller at an integration service executing in the management cluster, an indication of creation of a new tenant cluster in a container environment;

in response to the indication of the creation of the new tenant cluster, transmit, from the integration service to a service endpoint of a service provider, a request for deployment of a service associated with the service provider at the new tenant cluster;

in response to the request, receive, at the integration service, tenant cluster-specific configuration information from the service provider via the service endpoint;

generate, at the integration service, access credentials for the new tenant cluster;

provide, from the integration service to the service controller, the tenant cluster-specific configuration information and the access credentials; and deploy and manage, by the service controller, the service at the new tenant cluster using the tenant cluster-specific configuration information, the access credentials, and a service catalog associated with the service in the management cluster, wherein the service catalog comprises an application manifest including information regarding a related set of resources to be used for deploying the service in the new tenant cluster, and wherein the service at the new tenant cluster is to use the access credentials from the integration service and received at the service controller to communicate with the service provider.

18. The non-transitory machine-readable medium of claim 17, wherein the service catalog is provided by the service provider, and wherein the service catalog is provided pursuant to an Application Programming Interface (API) specification provided by the management cluster.

19. The non-transitory machine-readable medium of claim 17, wherein the service catalog stores an address of the service endpoint, and a tenant cluster namespace name for deploying the service at the new tenant cluster.

20. The non-transitory machine-readable medium of claim 17, wherein the instructions upon execution cause the management cluster to:

receive, at the integration service, a Representational State Transfer (REST) Application Programming Interface (API) call from the service controller requesting the tenant cluster-specific configuration information and the access credentials for deployment of the service at the new tenant cluster.

21. The method of claim 1, wherein the application manifest further includes at least one of a location of the information regarding the related set of resources to be used for deploying the service in the new tenant cluster or a version of the information regarding the related set of resources to be used for deploying the service in the new tenant cluster.

22. The method of claim 21, wherein the application manifest includes a location of a helm chart or a version of the helm chart to be used for deploying the service in the new tenant cluster.

* * * * *